(12) United States Patent
Lelonek (10) Patent No.: US 8,056,905 B1
(45) Date of Patent: Nov. 15, 2011

(54) COMPUTERIZED NUMERIC CONTROL TOOLHOLDER TIGHTENING FIXTURE

(76) Inventor: David J. Lelonek, Orchard Park, NY (US)

( * ) Notice: Subject to any disclaimer, the term of this patent is extended or adjusted under 35 U.S.C. 154(b) by 1113 days.

(21) Appl. No.: 11/845,987

(22) Filed: Aug. 28, 2007

Related U.S. Application Data (60) Provisional application No. 60/824,130, filed on Aug. 31, 2006.

(51) Int. Cl.
*B23B 31/107* (2006.01)
(52) U.S. Cl. ................................ 279/5; 279/75; 279/82
(58) Field of Classification Search ............... 279/5, 22, 279/57, 74, 82, 75, 79, 80; 409/221, 222, 409/223; 269/63, 69, 70
See application file for complete search history.

(56) References Cited

U.S. PATENT DOCUMENTS

| | | | | |
|---|---|---|---|---|
| 757,488 | A * | 4/1904 | Nichols | 269/70 |
| 2,881,667 | A | 4/1959 | Ebert | |
| 3,583,715 | A * | 6/1971 | Jahrl | 279/75 |
| 3,622,169 | A * | 11/1971 | Koch et al. | 279/76 |
| 3,708,178 | A * | 1/1973 | Lauricella | 279/81 |
| 3,848,865 | A | 11/1974 | Bird | |
| 4,057,884 | A | 11/1977 | Suzuki | |
| 4,682,521 | A | 7/1987 | Duenas | |
| 4,720,114 | A * | 1/1988 | Braitmaier et al. | 279/2.23 |
| 5,301,573 | A * | 4/1994 | Weber et al. | 81/53.2 |
| 5,335,556 | A | 8/1994 | Mogilnicki | |
| 6,394,465 | B1 | 5/2002 | Guy | |
| 6,415,696 | B1 | 7/2002 | Erickson et al. | |
| D483,241 | S | 12/2003 | Miller et al. | |
| 6,786,119 | B1 | 9/2004 | Erickson et al. | |
| 6,796,207 | B1 | 9/2004 | Long, Jr. et al. | |
| 6,811,160 | B2 * | 11/2004 | Canela Vinas | 279/72 |
| 7,143,490 | B2 * | 12/2006 | Hughes et al. | 29/243 |
| 2002/0148092 | A1 | 10/2002 | Van Metre | |

* cited by examiner

*Primary Examiner* — Daniel Howell
*Assistant Examiner* — Paul M Janeski
(74) *Attorney, Agent, or Firm* — Woods Oviatt Gilman LLP (57) ABSTRACT

A toolholder tightening fixture for selectively engaging a V-flange toolholder is provided. The fixture comprises a ball lock collar movably coupled relative to a housing and includes an inner surface having a recess formed therein. A lock housing is fixedly coupled with the fixture and is positioned within the ball lock collar. The lock housing includes at least one radial bore and is configured for receiving the toolholder. A lock ball is positioned within the radial bore of the lock housing. The ball lock collar is moved to an unlocked position when the lock ball is positioned in the recess in the ball lock collar to allow the toolholder to be inserted and removed from the lock housing. The ball lock collar is moved to a locked position when the lock ball is removed from the recess and placed in engagement with the toolholder.

1 Claim, 9 Drawing Sheets

COMPUTERIZED NUMERIC CONTROL TOOLHOLDER TIGHTENING FIXTURE

CROSS-REFERENCE TO RELATED APPLICATIONS

This application claims the benefit of U.S. Provisional Patent Application No. 60/824,130 filed on Aug. 31, 2006.

FIELD OF THE INVENTION

The present invention relates to a device or fixture that is used to hold and manipulate a V-Flange cutting toolholder used in conjunction with computerized-numeric-control (CNC) machinery.

BACKGROUND OF THE INVENTION

CNC Machine Tools utilize V-Flange toolholders which operate as a quick change interface between a machine tool spindle and a cutting tool. In order to manufacture a component/part using a CNC machine tool, one or more cutting tools are required to produce the component/part geometry. V-Flange toolholders provide a mounting location for the cutting tools and a taper shank interface to the spindle of the cutting machine. Variations of V-Flange holders are in use with current CNC machine tools, such specifications are, but not limited to, CAT, BT, HSK, NMTB, etc.

Several issues may arise with the day-to-day handling and setup of tools and toolholders. For example, toolholders have precision taper shank interfaces that need protection from damage and deformation that can impede the tool's performance and ultimately damage the machine tool spindle. While setting tools, it's imperative that the V-Flange toolholder be protected from damage. In addition, assembling the cutting tool to the V-Flange toolholder can be dangerous because the cutting tools have very sharp cutting edges. Therefore, the V-Flange toolholder needs to be securely fastened to a fixture surface to give the operator use of both hands for tool assembly, adjustment, and tightening. Further, most CNC machine tools require the use of a retention/pull stud to retain the V-Flange toolholder in the machine spindle. This retention stud is a separate component and therefore requires assembly to the V-Flange toolholder. This is a difficult task without immobilizing the V-flange toolholder using a fixture. Most components/parts that are produced using a CNC machine tool require the setup of many different cutting tools and therefore the speed of the operator to efficiently and safely handle and mount the cutting tools to the V-flange toolholder is of utmost importance.

Several types of holding fixtures for V-Flange toolholders currently exist on the market today. However, they lack extreme ease of use, safety, and flexibility. Some of the holding fixtures only allow for the tightening of cutting tools and have no provision for the tightening of the retention stud. Other holding fixtures merely have a place to hold the V-Flange toolholder, but do not clamp or safely retain the V-Flange toolholder in the fixture. All fixtures that currently exist lack the ability for the operator to totally handle all issues set forth above with ease, safety, and speed.

What is needed is a device or fixture that is used to hold and manipulate a V-Flange cutting toolholder with ease, safety, and speed. The present invention meets these needs as well as other needs.

SUMMARY OF THE INVENTION

In order to overcome the above stated problems, the present invention provides a fixture for an operator to handle, assemble, and tighten cutting tools and tool components of a V-Flange toolholder. The present invention allows the operator to quickly insert the V-Flange toolholder into the fixture, and provide a positive and rigid locking/securing of the V-Flange toolholder to the fixture with no other tools required. While inserting the V-Flange toolholder into the fixture, the precision taper shank of the V-Flange toolholder is protected throughout use of the fixture. In addition, the fixture contains symmetrical features to allow for any right or left handed person to use the fixture with no loss of comfort.

In particular, the toolholder tightening fixture of the present invention includes a housing and a ball lock collar movably coupled relative to the housing. The ball lock collar includes an inner surface, having a radial recess formed therein. The fixture further includes a lock housing fixedly coupled with the housing and positioned within the ball lock collar. The lock housing includes at least one radial bore defined therein and is configured for receiving the toolholder. The fixture further includes at least one lock ball positioned within the at least one radial bore of the lock housing. The ball lock collar is moved to an unlocked position when the at least one ball is positioned in the recess in the ball lock collar to allow the toolholder to be inserted and removed from the lock housing, and the ball lock collar is moved to a locked position when the at least one ball is removed from the recess and placed in engagement with the toolholder.

The fixture in accordance with the present invention may further include a spring positioned between the ball lock collar and the housing to bias the ball lock collar away from the fixture housing. A taper guide sleeve may be positioned within the lock housing for receiving the toolholder and to protect the V-flange toolholder from damage. A lock key may be coupled with the lock housing to properly orient the toolholder in the lock housing. The fixture may also include a ball retaining feature either where the radial bore is tapered toward the inner edge, or by deforming the inner edge of the radial bore. The travel of the ball lock collar relative to the lock housing may be limited by including a slot defined in the ball lock collar, and a dowel extending from the lock housing and being positioned within the slot.

In another aspect of the present invention, once the V-Flange toolholder is locked into the fixture, the fixture provides a mechanism for orienting the toolholder in 45 degree radial increments from its original vertical axis (cutting tool pointing upward, taper shank down) to allow access to the retention stud and allow the operator to choose a desired working position. In particular, the fixture's housing includes two separate components, a clamp housing and a pivot lock housing, wherein the ball lock collar is movably coupled relative to the clamp housing and the lock housing is fixedly coupled with the clamp housing. The clamp housing is rotatably mounted to the pivot lock housing about a pivot shaft that connected to both the clamp housing and the pivot lock housing. The clamp housing includes a plurality of radially spaced apart receiving bores formed therein, and the pivot lock housing has at least one lock pin slidably positioned within a corresponding number of pin bores formed therein for selectively engaging the receiving bores for establishing the relative rotational position of the clamp housing to the pivot lock housing. The lock pin is coupled to a pull knob to allow an operator to move the at least one lock pin between locked and unlocked positions.

BRIEF DESCRIPTION OF THE DRAWINGS

The accompanying drawings, which are incorporated into and form a part of the specification, illustrate the aspects of the present invention and, together with the description, serve to explain the principles of the invention. The drawings are only for the purpose of illustrating the aspects of the invention and are not to be construed as limiting the invention.

Corresponding reference characters indicate corresponding parts throughout the several views. The exemplifications set out herein illustrate the aspects of the invention, and such exemplifications are not to be construed as limiting the scope of the invention in any manner.

DETAILED DESCRIPTION OF THE INVENTION

The present invention is described in the following description and FIGS. 1-10 with reference to the use of V-Flange toolholders for machine tools.

Referring to the drawings in detail, and specifically FIGS. 2-5 and 8-10, a Computer Numeric Control (CNC) toolholder tightening fixture or device in accordance with the present invention is shown and is labeled with reference numeral 27. Fixture (27) may generally include a riser base (26) mounted to a pivot lock housing (19) using a bolt (38), and pivot lock housing (19) may in turn be rotatably coupled with a clamp housing (7). Fixture (27) further includes a ball lock mechanism (1a) that is supported by clamp housing (7), which may operate to securely clamp a V-Flange toolholder (1) into the fixture (27) in accordance with an aspect of the present invention.

Figure 1:
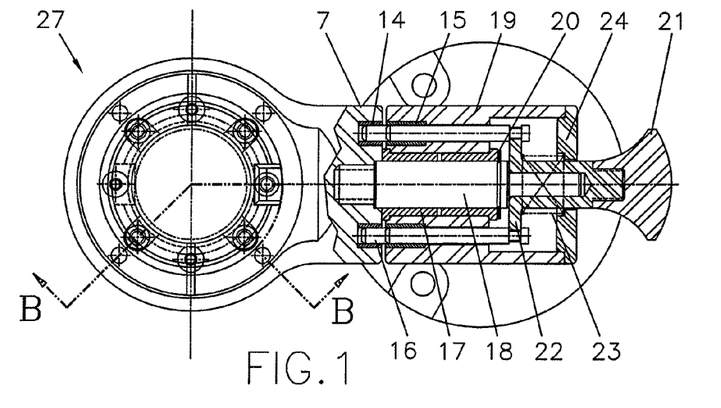
FIG. 1 is a top view of a toolholding tightening fixture in accordance with the present invention with a partial cross-section taken along line AA in FIG. 2.
Figure 2:
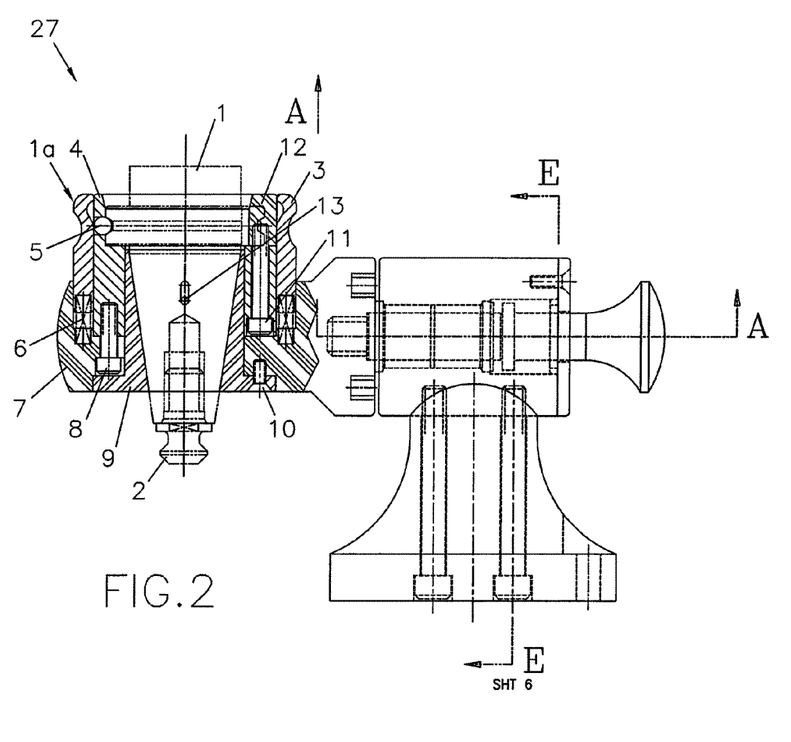
FIG. 2 is a side view of the fixture with a partial cross-section taken along line BB in FIG. 1, wherein the fixture is shown in a locked position.
Figure 3:
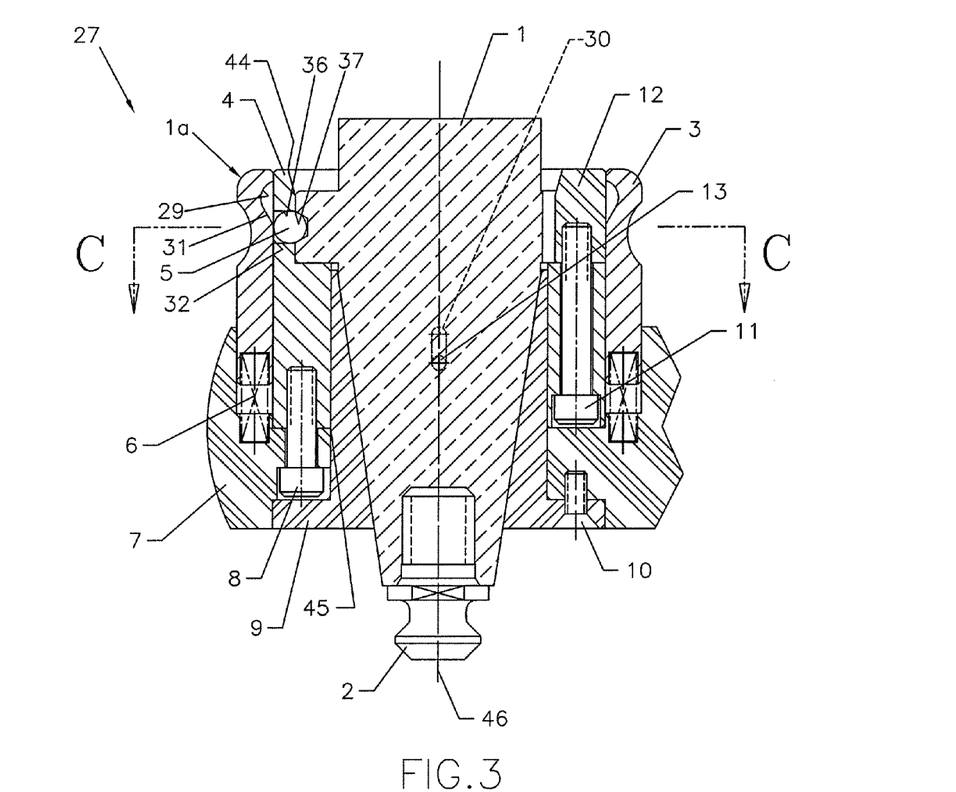
FIG. 3 is an enlarged view of the cross-sectional portion of the fixture shown in FIG. 2 showing a V-flange toolholder inserted and locked in the fixture.
Figure 3A:
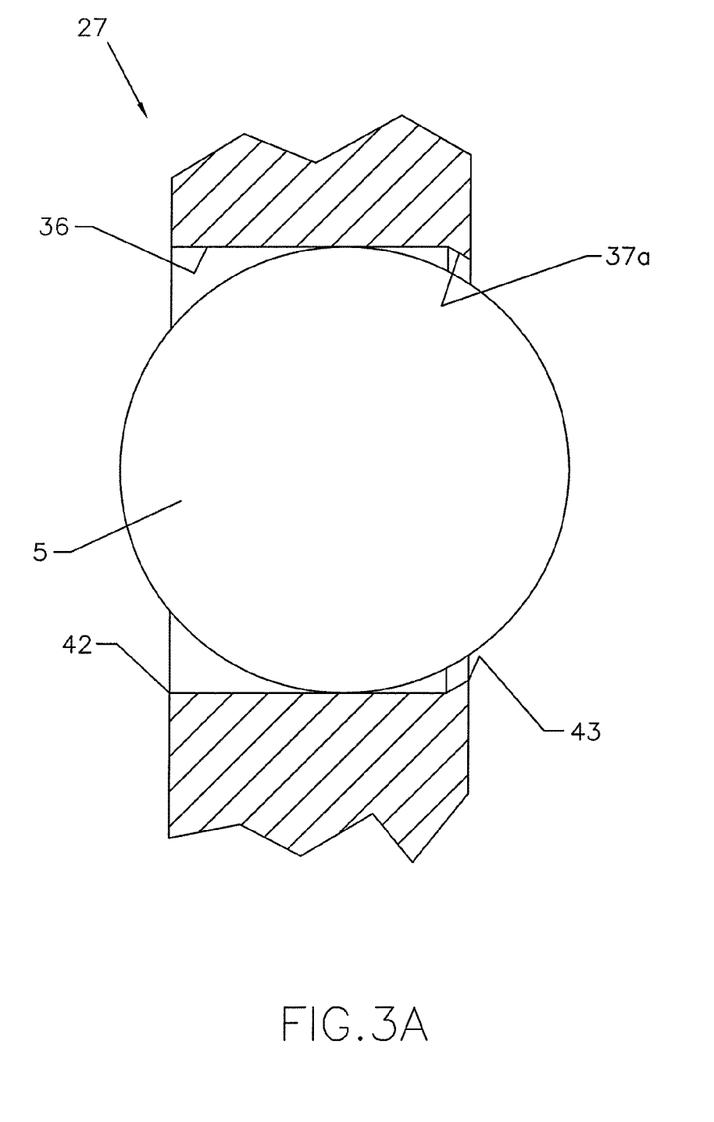
FIG. 3A is an enlarged view of one embodiment of the ball retaining feature shown in FIG. 3 including a tapered or reduction of material toward the inner edge of the bore.
Figure 3B:
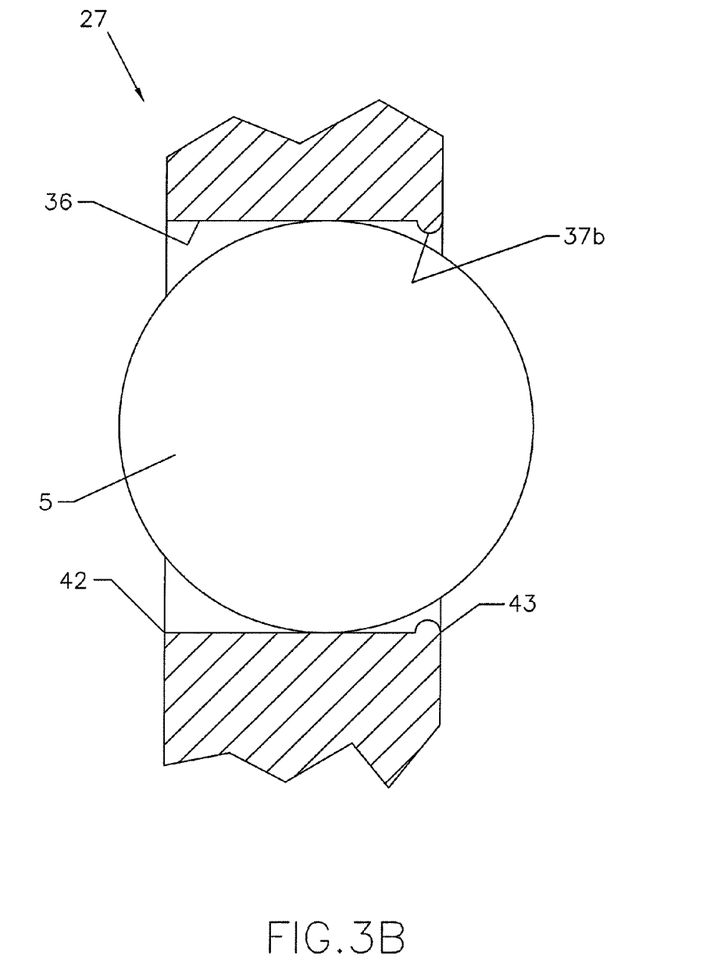
FIG. 3B is an enlarged view of another embodiment of the ball retaining feature shown in FIG. 3 including a deformed inner edge of the bore.
Figure 4:
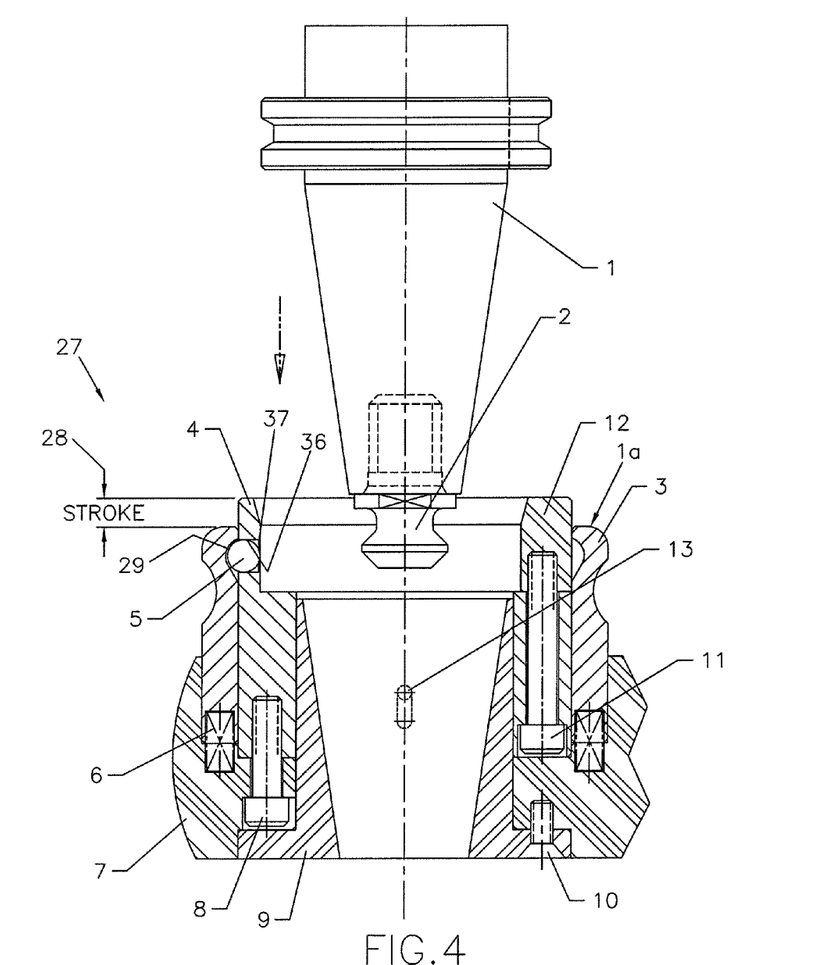
FIG. 4 is an enlarged view of the fixture similar to FIG. 3 showing the fixture in an unlocked position and the V-flange toolholder removed from the fixture.
Figure 5:
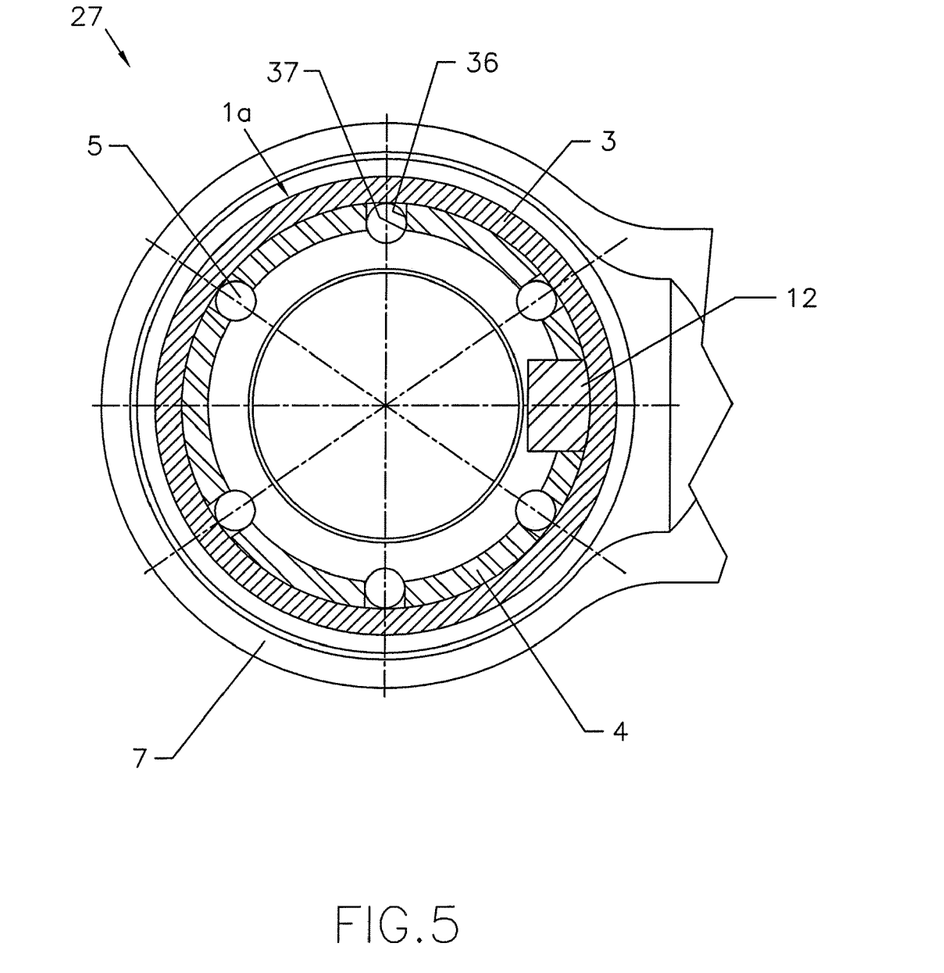
FIG. 5 is a cross-sectional view of the fixture taken along line CC in FIG. 3 with the V-flange toolholder removed from the fixture and the fixture in the locked position.

In particular, ball lock mechanism (1a) includes a ball lock housing (4) fixedly coupled with clamp housing (7) using at least one socket head cap screw (8), and a generally cylindrical ball lock collar (3) slidably positioned within a cylindrical groove formed between clamp housing (7) and ball lock housing (4), wherein one or more compression springs (6) are positioned between a lower recessed portion of collar (3) and clamp housing (7). The lock ball housing (4) includes a first distal end (44) and a second distal end (45), both the first and second distal ends (44, 45) define openings that are configured for allowing the toolholder (1) to extend therethrough. The openings in first and second distal ends (44, 45) have a common longitudinal axis (46) (FIGS. 9 and 10) that does not intersect riser base 26, wherein clamp housing (7) is cantilevered relative to riser base (26). Ball lock collar (3) includes an inner surface (32) that is in sliding contact with an outer surface of ball lock housing (4). As best seen in FIGS. 3-5, ball lock mechanism (1a) further includes one or more lock balls (5), for example six balls, positioned within a corresponding number of radial bores (36) defined in ball lock housing (4). Each bore (36) may include an outer edge (42) and an inner edge (43), wherein outer edge (42) is adjacent to inner surface (32) of ball lock collar (3). A ball retaining feature (37) may be formed in ball lock housing (4) toward the end of bore (36) to retain each of lock balls (5) within ball lock housing (4). For example, ball retaining feature (37a) may be in the form of a taper or reduction in the material toward the inner edge of bore (36). In another example, ball retaining feature (37b) may also be implemented by deforming the inner edge of bore (36) so that the diameter of bore (36) at the inner edge is less than the diameter of the remaining portion of bore (36). Further, ball lock collar (3) also includes a radial recess (29) defined in inner surface (32) that is adapted to receive lock balls (5) when fixture (27) is in an unlocked position.

As illustrated by FIGS. 4 and 5, actions of the operator to insert V-Flange toolholder (1) into fixture (27), specifically ball lock mechanism (1a), are shown. The insertion of V-flange toolholder (1) may be performed manually by an operator using both hands. First, using the left or right hand, the operator applies a downward force (against the normal spring load of spring (6)) on the ball lock collar (3) until ball lock collar (3) reaches its end of stroke or travel limit (28). By actuating ball lock collar (3), the one or more lock balls (5) are allowed to move outward into radial recess (29) within ball lock collar (3). While maintaining the applied downward force to ball lock collar (3), the operator, using the opposite hand, radially orients one of the two standard key notches of V-Flange toolholder (1) with a lock key (12) and places V-Flange toolholder (1) into ball lock housing (4). As best seen in FIG. 3, once V-Flange toolholder (1) is fully inserted into ball lock housing (4), the operator releases ball lock collar (3), causing the one or more compression springs (6) to exert a force on ball lock collar (3) and return it to the normal, upward position, limited by a dowel pin (13) pressed into ball lock housing (4) and clearance fit of a slot (30) within ball lock collar (3).

As best seen in FIG. 3, within recess (29) of ball lock collar (3), an angled surface (31) causes lock balls (5) to be gradually guided inward toward the V-Flange of toolholder (1). Lock balls (5) become inserted within the V groove of V-Flange toolholder (1) and thus clamp V-Flange toolholder (1) into ball lock housing (4) of the fixture, as shown in FIG. 3. With ball lock collar (3) in the upward position, and lock balls (5) inserted into the V groove the V-Flange toolholder (1), as shown by FIG. 3, lock balls (5) are prevented from moving outward, away from the V-Flange toolholder (1), by inner surface (32) of ball lock collar (3).

While inserting and removing V-Flange toolholder (1) from fixture (27), the taper of V-Flange toolholder (1) is protected by a taper guide sleeve (9), which may be made from a soft material (e.g., plastic, brass) to prevent damage to the precision taper of V-Flange toolholder (1). Taper guide sleeve (9) may also provide additional support and guidance to V-Flange toolholder (1) while inserted into fixture (27). It will be understood that taper guide sleeve (9) may be coupled with clamp housing (7) using a flat head cap screw (10), as best seen in FIG. 4.

As best seen in FIG. 3, once V-Flange toolholder (1) is inserted and locked into fixture (27), lock key (12) holds V-Flange toolholder (1) in a fixed radial orientation while one or more cutting tools and/or a retention stud (2) is assembled and tightened to V-flange toolholder (1). It will be understood that lock key may be coupled with ball lock housing (4) using a socket head cap screw (11).

Figure 6:
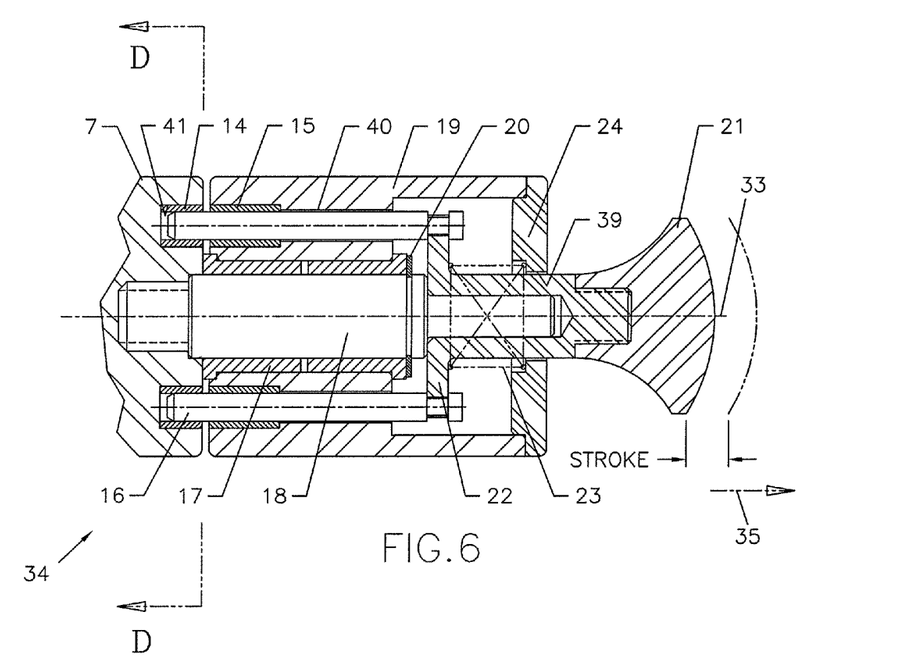
FIG. 6 is an enlarged view of the cross-sectional portion of the fixture shown in FIG. 1 showing the portion of the fixture that allows for radial orientation and 45 degree incremental locking.
Figure 7:
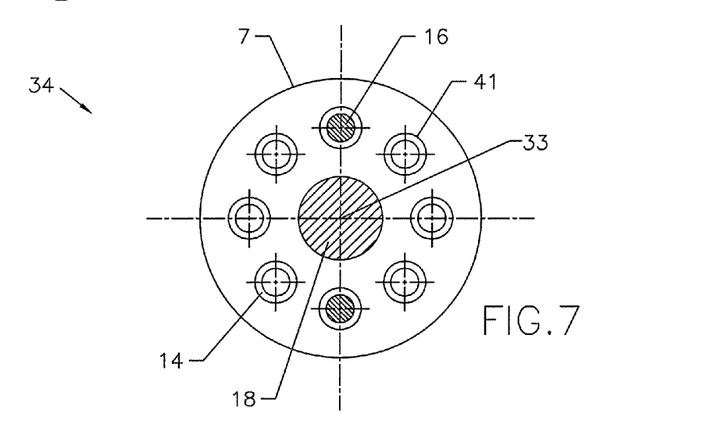
FIG. 7 is a cross-sectional view of the fixture taken along line DD in FIG. 6 showing aspects that allow for radial orientation and 45 degree incremental locking of the fixture.
Figure 8:
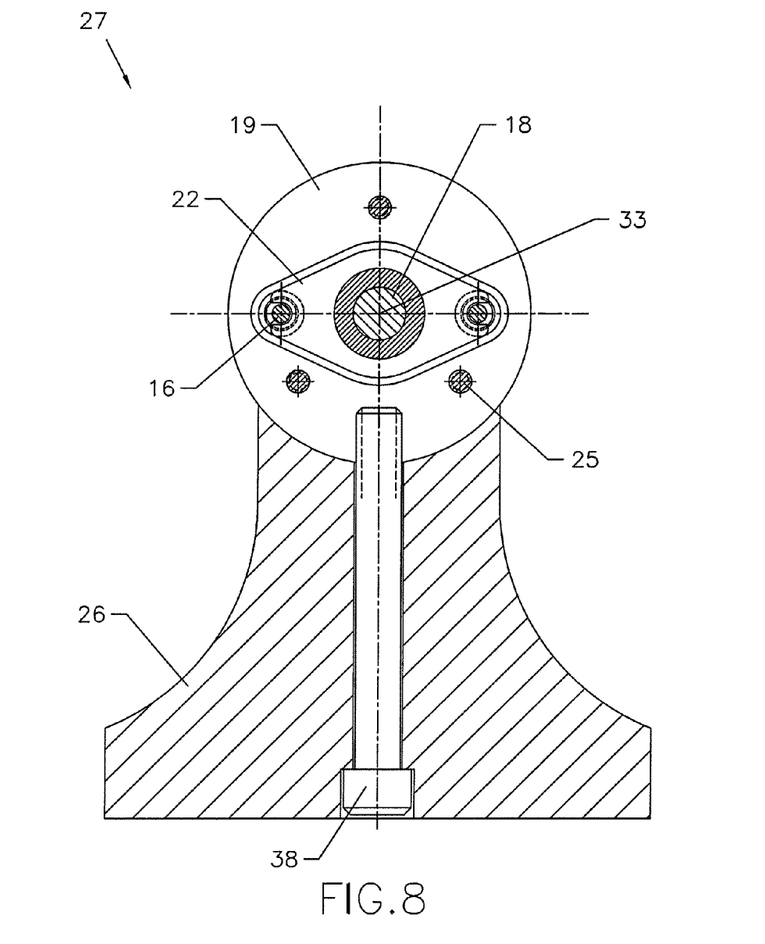
FIG. 8 is a cross-sectional view of the fixture taken along line EE in FIG. 2 showing aspects that allow for radial orientation and 45 degree incremental locking of the fixture.
Figure 9:
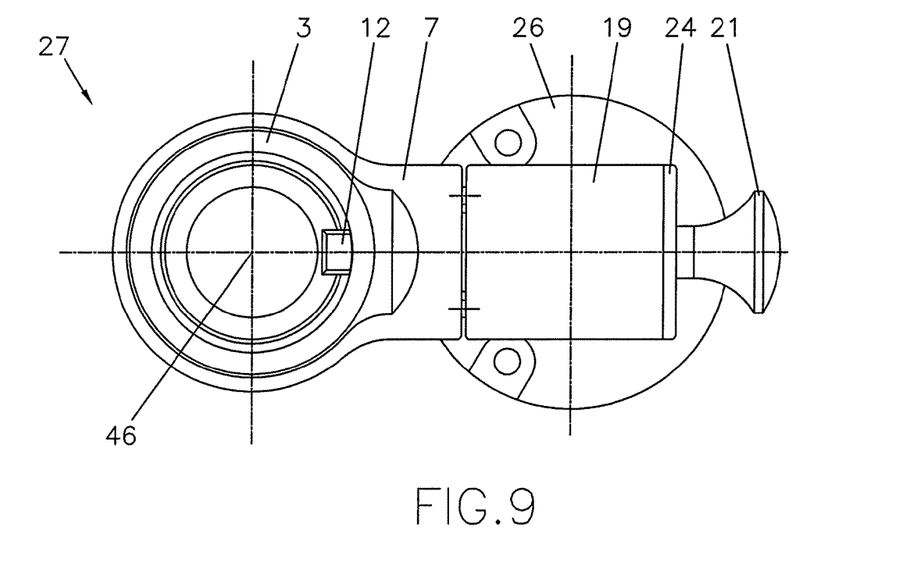
FIG. 9 is a top view of the fixture according to the present invention.
Figure 10:
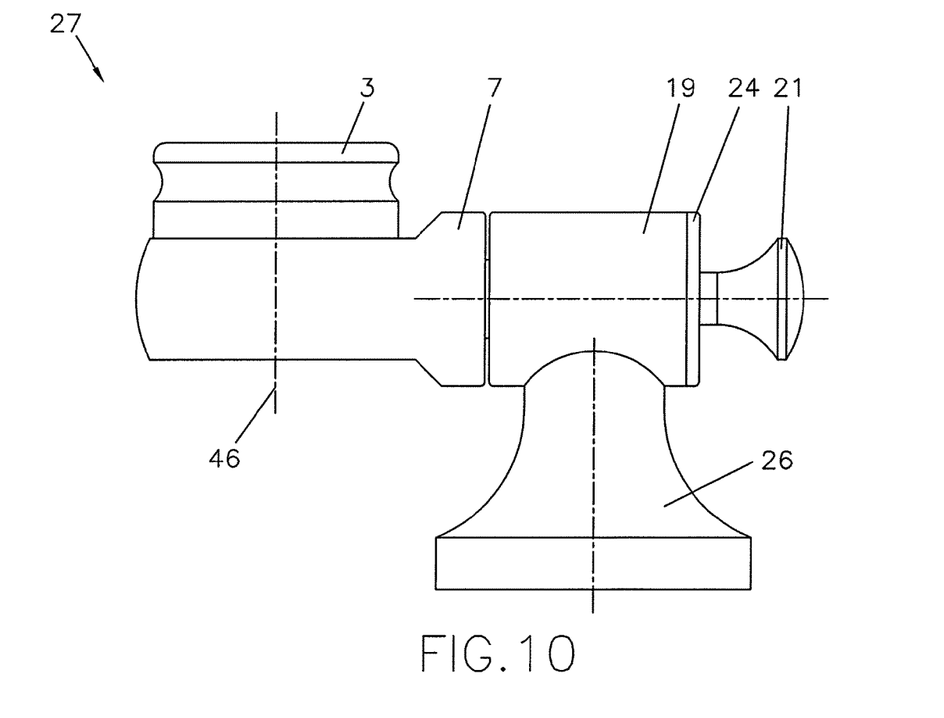
FIG. 10 is a side view of the fixture according to the present invention.

FIGS. 6, 7 and 8 illustrate another aspect of the present invention, namely, a rotating mechanism (34) that operates to rotate and lock the radial position of clamp housing (7) of ball lock mechanism (1a) relative to pivot lock housing (19). This aspect of the present invention allows the position of V-flange tool holder (1) to be changed while being held in fixture (27) to assist the operator in mounting a cutting tool or retention stud (2) to V-flange toolholder (1).

In order to stabilize fixture (27), riser base (26) may be mounted or otherwise secured to a workbench or support area. A pivot shaft (18) operates to pivotally couple clamp housing (7) to pivot lock housing (19) and riser base (26). Pivot shaft (18) is positioned within one or more flanged bushings (17), and flanged bushings (17) are in turn positioned within a bore defined in pivot lock housing (19). Further, a retaining ring (20) is used to retain pivot shaft (18) in housing (19). A lock pin release link (22) is mounted to pivot shaft (18) and is in turn mounted to a pull knob (22). One or more lock pins (16) are slidably positioned within a corresponding number of pin bores (40) formed in pivot lock housing (19), and each of pins (16) are adapted to be selectively inserted into radially spaced apart receiving bores (41) formed in clamp housing (7) to set the position of clamp housing (7) relative to pivot lock housing (19). It will be understood that the receiving bores (41) in the clamp housing may have bushings (14) positioned therein, and the pin bores (40) in the pivot lock housing (19) may also have bushings (15) positioned therein. The pins (16) are fixedly mounted with lock pin release link (22) and therefore may be slid within the pin bores (40) using pull knob (21). Pull knob (21) and lock pin release link (22) are connected through an aperture (39) formed in a retainer cap (24) that may be mounted to pivot lock housing (19) using one or more flat head cap screws (25). Further, a compression spring (23) is positioned between lock pin release link (22) and retainer cap (24) to bias lock pins into receiving bores (41) in clamp housing (7).

In order to rotate clamp housing (7) about pivot axis (33) of pivot shaft (18), an operator applies a pull force to pull knob (21) in a direction (35) which transmits that force to lock pin release link (22) and the one or more lock pins (16), against the normal force exerted by compression spring (23) positioned between an outer surface of lock pin release link (22) and an inner surface of retainer cap (24). This action by the operator disengages lock pins (16) from bushings (14) allowing clamp housing (7) to rotate about the axis of pivot shaft (18) within the one or more flanged bushings (17).

The one or more bushings (14) and/or radially positioned receiving bores (41) may be located every 45 degrees from the center of clamp housing (7). This allows the operator to release the applied force to pull knob (21) and lock clamp housing (7) in 45 degree radial increments about housing (19), therefore providing the operator with the flexibility of multiple work positions for maximum comfort and tool accessibility. It will also be understood and appreciated that bushings (14) and/or receiving bores (41) may be located at other radial positions, other than 45 degrees, such as, but not limited to, every 30 degrees.

While the invention has been described with reference to preferred aspects, it will be understood by those skilled in the art that various changes may be made and equivalents may be substituted for elements thereof to adapt to particular situations without departing from the scope of the invention. Therefore, it is intended that the invention not be limited to the particular aspects disclosed as the best mode contemplated for carrying out this invention, but that the invention will include all embodiments falling within the scope and spirit of the description provided herein.

LIST OF REFERENCE NUMBERS

| | |
|---|---|
| 1 | V-Flange Tool Holder |
| 1a | Ball Lock Mechanism |
| 2 | Retention Stud |
| 3 | Ball Locking Collar |
| 4 | Ball Lock Housing |
| 5 | Ball |
| 6 | Compression Spring, Ball Lock Collar |
| 7 | Clamp Housing |
| 8 | Socket Head Cap Screw (Ball Lock Housing) |
| 9 | Taper Guide Sleeve |
| 10 | Flat Head Cap Screw (Taper Guide Sleeve) |
| 11 | Socket Head Cap Screw (Lock Key) |
| 12 | Lock Key |
| 13 | Dowel Pin (Ball Lock Collar) |
| 14 | Bushing, Clamp Housing |
| 15 | Bushing, Housing Pivot Lock |
| 16 | Lock Pin |
| 17 | Flanged Bushing |
| 18 | Pivot Shaft |
| 19 | Pivot Lock Housing |
| 20 | Retaining Ring/Clip |
| 21 | Pull Knob |
| 22 | Lock Pin Release Link |
| 23 | Compression Spring, Lock Pin |
| 24 | Retainer Cap |
| 25 | Flat Head Cap Screw (Retainer Cap) |
| 26 | Riser Base |
| 27 | Fixture or Device |
| 28 | Stroke or Travel Limit |
| 29 | Radial Recess |
| 30 | Slot |
| 31 | Angled Surface |
| 32 | Inner Surface |
| 33 | Pivot Axis |
| 34 | Rotating Mechanism |
| 35 | Pull Direction |
| 36 | Radial Bore |
| 37 | Ball Retaining Feature |
| 38 | Bolt |
| 39 | Aperture |
| 40 | Pin Bore |
| 41 | Receiving Bore |

| | |
|---|---|
| 42 | Outer Edge |
| 43 | Inner Edge |
| 44 | First Distal End |
| 45 | Second Distal End |
| 46 | Longitudinal Axis |

The invention claimed is:

1. A toolholder tightening fixture for selectively engaging a V-flange toolholder, the fixture comprising:
a pivot lock housing;

at least two lock pins slidably positioned within a corresponding number of pin bores formed in the pivot lock housing;

a clamp housing rotatably mounted to the pivot lock housing about a pivot shaft that is connected to the clamp housing and the pivot lock housing, the clamp housing including at least two radially spaced apart receiving bores formed therein configured for receiving the two lock pins for establishing the relative rotational position of the clamp housing to the pivot lock housing;

a ball lock collar movably coupled within a cylindrical groove formed between the clamp housing and the lock housing, the ball lock collar including an inner surface having a recess formed therein;

a spring positioned between the ball lock collar and the clamp housing;

a lock housing fixedly coupled with the clamp housing and positioned within the ball lock collar, the lock housing includes at least one radial bore defined therein, the lock housing including a first distal end and a second distal end, both the first and second distal ends define openings that are configured for allowing the toolholder to extend therethrough;

a lock key fixedly coupled with the lock housing for properly orienting the toolholder in the locking key; and at least one lock ball positioned within the at least one radial bore of the lock housing, wherein the ball lock collar is moved to an unlocked position when the at least one ball is positioned in the recess in the ball lock collar to allow the toolholder to be inserted and removed from the lock housing, and wherein the ball lock collar is moved to a locked position when the at least one ball is removed from the recess and placed in engagement with the toolholder.

\* \* \* \* \*